US008356625B2

(12) United States Patent
Gneuss

(10) Patent No.: US 8,356,625 B2
(45) Date of Patent: Jan. 22, 2013

(54) DEVICE FOR THE CONTROLLED GUIDANCE OF A POLYMER MELT

(75) Inventor: Detlef Gneuss, Bad Oeynhausen (DE)

(73) Assignee: Gneuss Kunststofftechnik GmbH, Bad Oeynhausen (DE)

( * ) Notice: Subject to any disclaimer, the term of this patent is extended or adjusted under 35 U.S.C. 154(b) by 670 days.

(21) Appl. No.: 12/446,273

(22) PCT Filed: Oct. 22, 2007

(86) PCT No.: PCT/EP2007/009129
§ 371 (c)(1),
(2), (4) Date: Apr. 20, 2009

(87) PCT Pub. No.: WO2008/049559
PCT Pub. Date: May 2, 2008

(65) Prior Publication Data
US 2010/0024903 A1 Feb. 4, 2010

(30) Foreign Application Priority Data
Oct. 24, 2006 (DE) .......................... 10 2006 050 683

(51) Int. Cl.
*B29C 47/68* (2006.01)
(52) U.S. Cl. .............. 137/547; 137/625.46; 137/625.47; 137/625.18; 137/625.19
(58) Field of Classification Search ................... 137/269, 137/547, 550, 625.46, 625.47, 625.18, 625.19; 141/205, 228
See application file for complete search history.

(56) References Cited

U.S. PATENT DOCUMENTS

| 4,130,128 | A | * | 12/1978 | Kaneko | 137/269 |
| 4,702,457 | A | * | 10/1987 | Lew et al. | 251/161 |
| 5,004,414 | A | | 4/1991 | Stude | 425/185 |
| 5,467,796 | A | * | 11/1995 | Pettinaroli et al. | 137/238 |
| 5,605,626 | A | * | 2/1997 | Gneuss | 210/236 |
| 5,916,201 | A | * | 6/1999 | Wilson et al. | 604/248 |
| 6,500,336 | B1 | | 12/2002 | Gneuss | 210/236 |
| 6,550,497 | B2 | | 4/2003 | Thiele | 137/625.46 |
| 7,011,112 | B2 | | 3/2006 | Chszaniecki | 137/876 |

FOREIGN PATENT DOCUMENTS

| DE | 2844246 | | 4/1980 |
| DE | 10056557 | | 11/2000 |
| DE | 10056557 | * | 5/2001 |
| EP | 0399086 | | 5/1989 |

* cited by examiner

*Primary Examiner* — Jason J Boeckmann
*Assistant Examiner* — Joel Zhou
(74) *Attorney, Agent, or Firm* — Andrew Wilford

(57) ABSTRACT

A valve has a housing formed with a central chamber centered on and extending along a main axis, an inlet passage and an outlet passage having mouths in the chamber spaced angularly from and confronting each other, and a secondary passage offset from the inlet and outlet passages and centered on an axis offset from a center of one of the mouths by more than 90°. A valve pin fitted in the chamber is formed with a secantally throughgoing flow passage centered on a flow-passage axis generally parallel to but offset from a diameter of the pin. A filter is provided in the flow passage, the secondary passage being sufficiently large that, when the pin is pivoted to align the flow passage with the secondary passage, the filter can be removed from the flow passage through the secondary passage.

13 Claims, 4 Drawing Sheets

DEVICE FOR THE CONTROLLED GUIDANCE OF A POLYMER MELT

CROSS REFERENCE TO RELATED APPLICATIONS

This application is the US national stage of PCT application PCT/EP2007/009129, filed 22 Oct. 2007, published 2 May 2008 as WO2008/049559, and claiming the priority of German patent application 102006050683.9 itself filed 24 Oct. 2006, whose entire disclosures are herewith incorporated by reference.

FIELD OF THE INVENTION

The invention relates to an apparatus for controlled feeding of a plastic melt, comprising a housing with an inlet passage and an outlet passage for the plastic melt, in which a control element may be moved between the mouths of the inlet and outlet passages transverse to the inlet passage and the outlet passage to seal same and this control element is a rotatable pin having a flow passage for the plastic melt and can be rotated from a first to a second position by means of a rotary arm.

BACKGROUND OF THE INVENTION

Screen changers are known that may be brought in and out of an operating position by axially displacing a pin or plate in a housing. EP 1,044,094 [U.S. Pat. No. 6,500,336], for example, describes a screen changer in which two filter disks are provided in a slider used as a screen holder. The screen may be exchanged as soon as it exits the housing. It is disadvantageous that a high expenditure of force is necessary to axially displace the screen holder pin, i.e. to laterally move the slider. In such screen changers a screen change occurs infrequently, i.e. at large time intervals of several days to a week, as the result of which the screen holder often becomes encrusted in the housing, so that it moves sluggishly and only with great difficulty.

A multiport valve devoid of dead space is known from EP 1,167,844 [U.S. Pat. No. 6,550,497] for distributing and/or dividing at least one charge of fed plastic melt during production and processing of same, in which the melt flows through all inner chambers of the valve during each operating state. However, such a design is very complicated.

DE 102 34 228 [U.S. Pat. No. 7,011,112] definitively discloses a start-up valve for an extruder having a double passage centrally located in the valve pin. In normal operation, however, the overlap between the valve pin and the housing in the region of the start-up passage is so small that leaks always occur. A secure seal is not ensured in this case. As a result of the central location of the bore in the pin, much material remains in the pin itself as well as on the housing, and this material must be heated to ensure that the start-up valve operates reliably. The start-up valve requires costly materials for its manufacture, and has a high energy demand for operation.

A screen changer for extruders is known from DE 2,844,246 which likewise operates by means of rotary pins having central bores, whose diameters correspond to the feeding discharge passages and which are situated in the screen packs above screen support plates. Rotation of the rotary pin by 90° allows the screen packs to be removed through the closable opening. Here as well, the overlap between the rotary pin and the housing in the region of the removal opening is extremely small, so that leaks always occur during operation of the filter which, however, may be collected by a trap. Here as well, a large amount of material must be heated, which entails significant energy costs.

OBJECT OF THE INVENTION

The object of the present invention is to provide an apparatus of the type described above that is inexpensive and as compact as possible. A further aim is to allow various functions to be carried out with a small number of different components.

SUMMARY OF THE INVENTION

The object is achieved according to the invention by the fact that the flow passage is eccentrically situated in the rotatable pin, the pin is a screen holder that in its flow passage accommodates a filter disk as a screen, whereby in the first position the plastic melt is filtered as it flows through the flow passage, and in the second position the flow passage is aligned with a bore in the housing through which the filter disk may be removed, and the pin is rotated by more than 90° from the operating position into the exchange position.

As a result of the eccentric flow passage, i.e. the flow passage being laterally offset parallel to the pin diameter, for the same coverage of the pin for the housing in the region of the removal hole with respect to a central location of the flow passage, the pin, and in conjunction therewith also the housing, may have a much more compact design, thereby realizing large material savings as well as significant savings in energy costs, i.e. operating expenses.

The object is also attained according to the invention by the fact that the flow passage is eccentrically situated in the rotatable pin, and the pin is a valve pin of a discharge valve, and the pin has a blind hole perpendicular to the flow passage in the side of which a discharge passage extends downward to the center of the underside of the pin and to the outlet.

Here as well, the eccentric configuration of the flow passage reduces the material expense and the heating costs, and ensures that sufficient space is available for the blind hole and the discharge passage in the pin.

It should also be noted that various functions, in this case a screen changer and a start-up valve, may all be executed with a small number of different components.

A simple attachment of a drive for the rotatable pin may be achieved by installing a connector fitting for a drive on the housing.

The drive may advantageously have an actuating link rotatably connected at the end of the rotary arm, the actuating link being driven by a piston drive connected at a pivot to the connector fitting.

The housing may be provided with heating cartridges to keep the melt liquid.

To prevent stress on the seals of the piston drive and to avoid loss of thermal energy, according to the invention the rotatable pin, the rotary arm, and/or the actuating link may be thermally decoupled.

The rotary arm and/or the actuating link may be made of a thermally insulating material or from a material having low thermal conductivity.

It has proven to be advantageous for the screen holder pin to be rotated from the operating position by more than 90° and less than 180°, preferably by 110°.

Instead of removing the filter disk from the housing by use of a tool inserted through the bore, on the opposite side of the screen removal opening a bore may be provided as an opening in the housing for a tool by means of which the filter disk may be knocked out.

It is advantageous for the rotary arm to be detachably connected to the pin, and after detachment from the rotary arm, for the pin to be axially removable from the housing, for example for maintenance or replacement. The housing itself need not be dismounted.

BRIEF DESCRIPTION OF THE DRAWING

The invention is explained in greater detail below with respect to embodiments illustrated in the drawings, in which.

DETAILED DESCRIPTION

Figure 1:
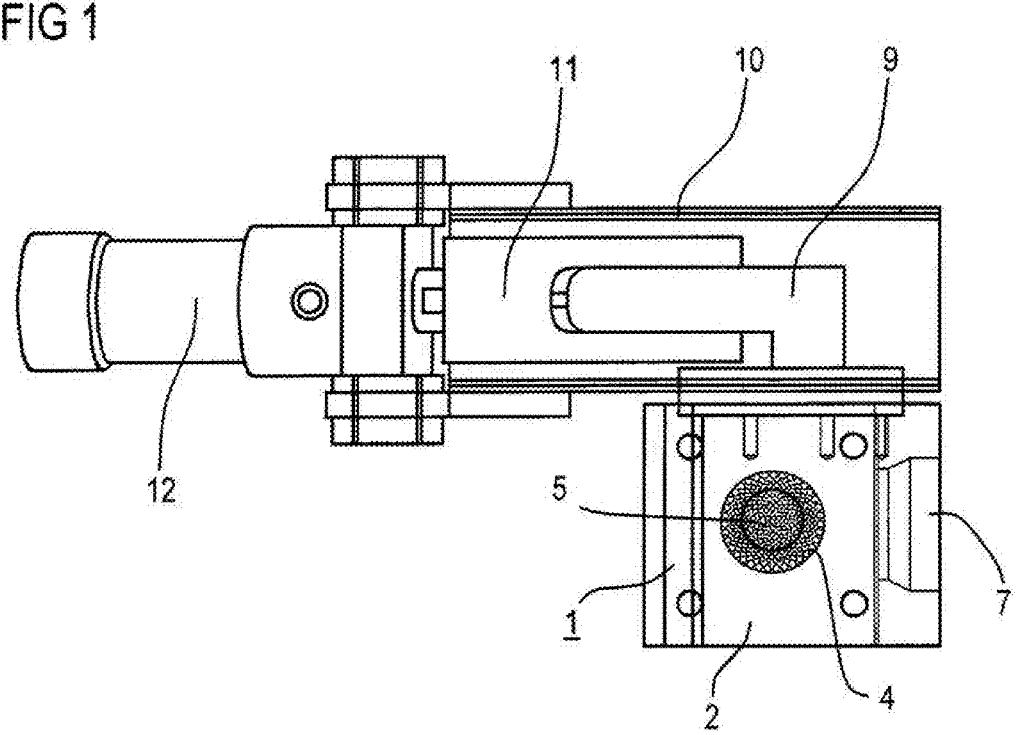
FIG. 1 is a side view of a screen changer according to the invention.
Figure 2:
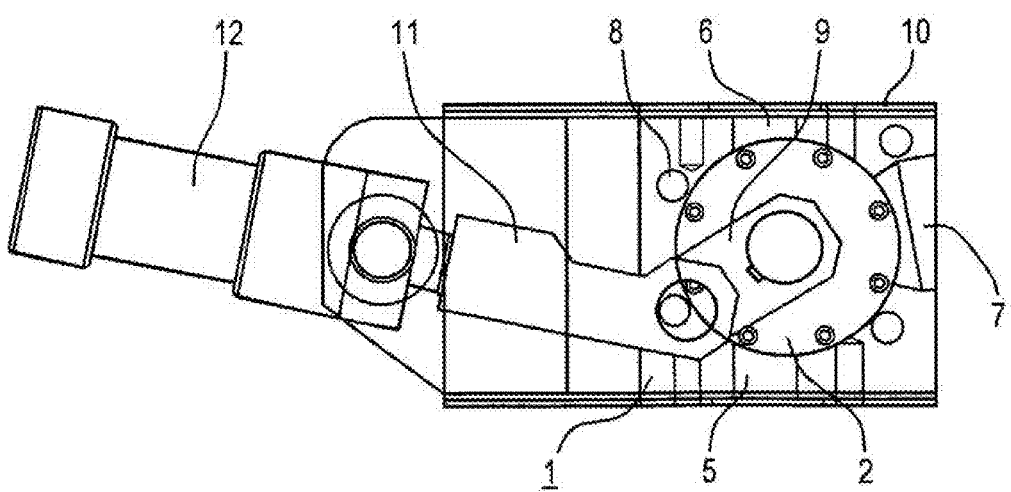
FIG. 2 is a top view of the screen changer according to FIG. 1.
Figure 3:
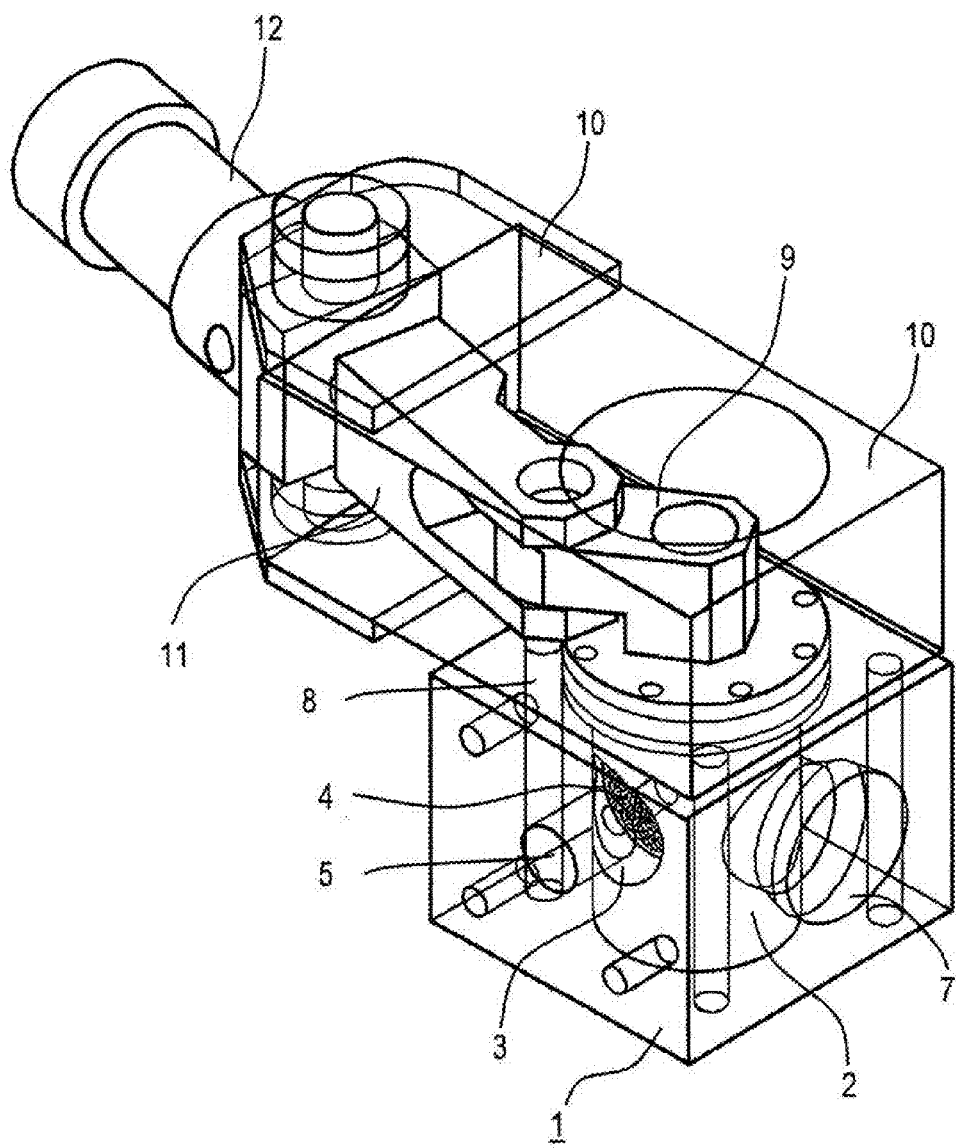
FIG. 3 is a perspective wire-frame view of the screen changer.

FIG. 1 shows a first embodiment of a screen changer according to the invention for purifying plastic melts, comprising a housing 1 in which a pin 2 in the form of a perpendicular rotatable screen holder pin is provided that is provided with an asymmetrical bore that is laterally offset parallel to a diameter of the pin 2. A filter disk 4 is provided in the bore that forms the flow passage 3. An inlet passage 5 and an outlet passage 6 situated opposite therefrom are formed in the housing 1, as also is shown in FIG. 2 in a top view of the screen changer, and as shown in FIG. 3, in which the screen changer is illustrated in a perspective view. Provided at an angle of >90°, for example 110°, relative to the inlet passage 5 is a screen removal opening 7 through which the filter disk 4 may be exchanged, as described further below. Heating cartridges 8 are provided in the housing 1 for conducting heat in order to keep the plastic melt liquid.

A rotary arm 9 for actuating the pin 2 is mounted on and affixed to a journal of the pin 2. A connector fitting 10 on the housing 1 carries a pivotally attached drive 12, for example a piston cylinder unit, by means of which an actuating link 11 may be driven. The actuating link 11 is rotatably mounted at the end of the rotary arm 9 so that the pin 2 may be rotated from its working or operating position by an angle of 90°, for example 110°, into its maintenance position for exchanging the screen or filter, as the result of which the flow passage 3 is aligned with the screen removal opening 7.

Figure 4:
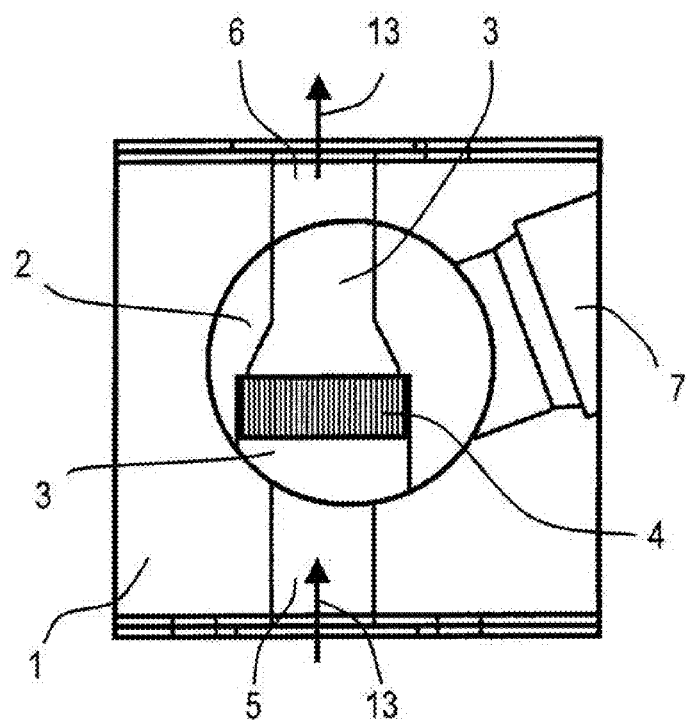
FIG. 4 is a cross section of the housing for the screen changer in the flow position.

FIG. 4 illustrates the screen changer in its operating position, with the housing 1 and pin 2 shown in cross section. The plastic melt flows from the extruder in the direction of the arrow 13 through the inlet passage 5 and into the large-diameter portion of the flow passage 3 of the pin 2. At that location the plastic melt meets the filter disk 4, downstream from which the flow passage 3 tapers to a small diameter portion the same as the outlet passage 6, and the filtered plastic melt is delivered to the mold. The filter disk 4 is retained by formations that reduce the flow cross section of the flow passage 3 as the result of the pressure of the plastic melt acting on the filter disk 4. The screen is removal opening 7 whose operation is explained in greater detail in conjunction with FIG. 5 is at an angle of 70° relative to the arrow 13.

Figure 5:
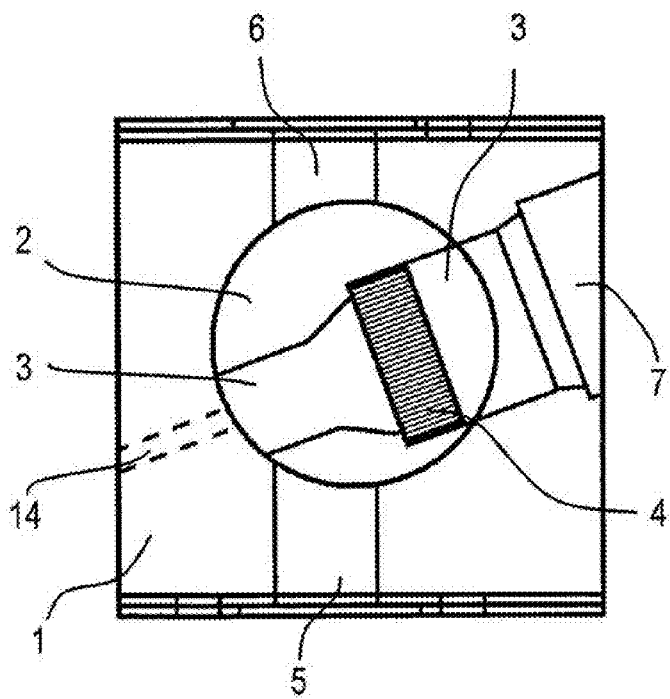
FIG. 5 is a cross section of the housing for the screen changer in the exchange position.

FIG. 5 illustrates the screen changer in its maintenance position for exchanging the filter. The drive 12 has rotated the pin 2 counterclockwise by 110°, so that the wide portion of the flow passage 3 of the pin 2 is aligned with the screen removal opening 7. This blocks the inlet passage 5, thus preventing the plastic melt from advancing farther. By use of a tool, in this maintenance or exchange position the used or plugged filter disk 4 may be removed from the flow passage 3 of the pin 2, and in its place a new or cleaned filter disk 4 may be inserted. The pin 2 may then be rotated back so that the plastic melt is able to flow once again.

Instead of a specialized tool, the bore 14 illustrated in dashed lines may be provided, through which the filter disk 4 may be pushed out from behind from the flow passage 3 and the screen removal opening 7, using a slider or pin, for example.

By use of the apparatus according to the invention, the screen holder is not axially displaceable in the housing 1, but instead is rotatable as a pin 2. By means of appropriate leverage a desired high force may be applied, and in addition the pin 2 during rotation does not have large surfaces exposed to air that can crack the plastic, as is the case for axially or laterally displaceable screen holders according to EP 1,044,094, for example.

The following features are provided to allow the screen changer to be manufactured with as compact a design as possible:

As a result of the asymmetrical configuration of the flow passage 3 in the pin 2, the different diameters of the flow passage 3, and the pivoting of the pin 2 from the operating position by more than 90°, the filter may have a very compact design, and a sufficient sealing surface is present between the inlet passage 5 and the screen removal opening 7. On the side opposite the screen removal opening 7 the opening or bore 14 may be provided for a slider or pin which is able to eject the screen. In addition, because the opening is significantly smaller, there is a sufficient sealing surface between the inlet passage and the small bore 14, although in this case the angle is less than 90°, so that liquid melt is not able to exit from the screen removal opening 7 or the slide opening 14. The angle should be >90° and must be <180°, since otherwise the screen would merely be rotated. The screen holder pin is generally pivoted by approximately 110°.

The screen changer is heated by the heating cartridges 8 to keep the plastic melt liquid. Since as a result of the very compact design of the screen changer large quantities of thermal energy could be transmitted to the drive 12 via the rotary arm 9 and the actuating link 11, thereby subjecting the seals of the drive 12 to severe stress and also resulting in loss of considerable thermal energy, according to the invention thermal decoupling is provided between the screen changer and its drive 12. The rotary arm 9 and/or the actuating link 11 may be made of a thermally insulating material, or may be designed in such a way that only low heat conduction occurs.

Figure 6:
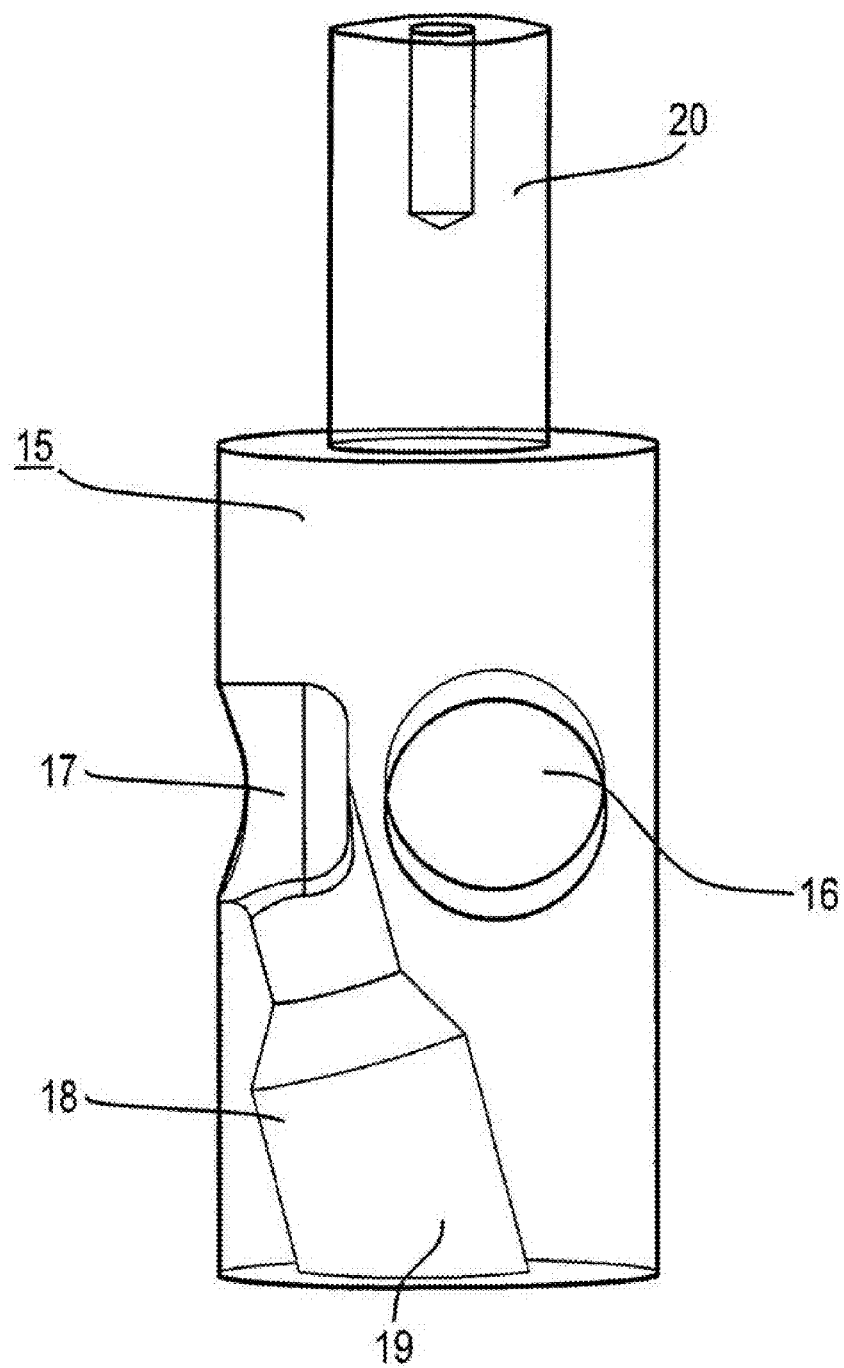
FIG. 6 is a side view of a valve pin according to the invention for a discharge valve for use in the housing for the screen changer according to FIGS. 1 through 3.

As a second alternative according to the invention, instead of a screen changer a discharge valve may be designed in the same way. This may be achieved in a simple manner by replacing the pin 2, in the form of a screen holder pin, by a pin 15 in the form of a valve pin illustrated in FIG. 6. This pin likewise has an asymmetrical bore in the form of a flow passage 16 which is laterally offset from but parallel to the diameter. On the other side a blind hole 17 extends perpendicular to the flow passage 16, but the blind hole does not extend into the flow passage 16. In the side of the blind hole 17 a discharge passage 18 extends downward at an angle until it reaches the center of the underside of the pin 15 where an outlet 19 is located. On the top side of the pin 15 a connecting shaft 20 is provided for accommodating and fastening the rotary arm 9, by means of which the pin 15 is able to rotate in the housing 1.

In the flow position of the discharge valve, the same as for the screen changer, the flow passage 16 is in flush alignment with the inlet passage 5 and outlet passage 6, thus allowing the plastic melt to flow through unhindered. In the second position, the discharge position, the pin 15 is rotated by 90° so that the blind hole 17 is located in front of the inlet passage 5. In this manner the plastic melt is diverted, and passes through the discharge passage 18 and through the outlet 19 and into a collection bin as scrap, for example. However, a second tool may be connected so that the valve functions as a normal two-way valve.

The discharge valve is necessary so that upon start-up of continuous casting machines or extruders the "scrap material" which has not yet been properly heated is diverted. The material must be present with the desired consistency and composition before the discharge valve is switched to allow flow by rotating the pin 15 by 90°.

The invention claimed is:

1. A valve comprising:
a housing formed with
    a central chamber centered on and extending along a main axis,
    an inlet passage and an outlet passage having mouths in the chamber spaced angularly from and confronting each other, and
    a secondary passage offset from the inlet and outlet passages and centered on an axis offset from a center of one of the mouths by more than 90°;
a valve pin fitted in the chamber formed with a secantally throughgoing flow passage centered on a flow-passage axis generally parallel to but offset from a diameter of the pin, the valve pin being angularly shiftable between
    a use position with the flow passage aligned between the mouths of the inlet and outlet passages for flow of liquid between the inlet and outlet passages through the flow position and
    another position with the flow passage aligned with the secondary passage and not aligned with the inlet and outlet passages and the pin blocking flow into and out of the inlet and outlet passages through the respective mouths; and
a filter in the flow passage, the secondary passage being sufficiently large that in the other position the filter can be removed from the flow passage through the secondary passage, the housing being formed on the opposite side from the secondary passage with a bore provided as an opening in the housing for a tool by means of which the filter is removable.

2. The apparatus according to claim 1 wherein a connector fitting for a drive is installed on the housing.

3. The apparatus according to claim 2 wherein the drive is pivotally affixed to the connector fitting, and is able to drive an actuating link associated with the drive, the actuating link being rotatably connected at the end of the rotary arm.

4. The apparatus according to claim 2 wherein the housing is provided with heating cartridges.

5. A valve comprising:
a housing formed with
    a central chamber centered on and extending along a main axis,
    an inlet passage and an outlet passage having mouths in the chamber spaced angularly from and confronting each other, and
    a secondary passage offset from the inlet and outlet passages and centered on an axis offset from a center of one of the mouths by more than 90°;
a rotatable valve pin fitted in the chamber and formed with a secantally throughgoing flow passage centered on a flow-passage axis generally parallel to but offset from a diameter of the pin;
a rotary arm extending from the pin;
a connector fitting on the housing;
a drive pivotally mounted on the connector fitting;
an actuating link pivotally connected between the drive and the rotary arm, the rotatable pin, the rotary arm, or the actuating link being thermally decoupled, the valve pin being angularly shiftable by the drive between
    a use position with the flow passage aligned between the mouths of the inlet and outlet passages for flow of liquid between the inlet and outlet passages through the flow position and
    another position with the flow passage aligned with the secondary passage and not aligned with the inlet and outlet passages and the pin blocking flow into and out of the inlet and outlet passages through the respective mouths; and
a filter in the flow passage, the secondary passage being sufficiently large that, in the other position the filter can be removed from the flow passage through the secondary passage.

6. The apparatus according to claim 5 wherein the rotary arm or the actuating link are made of a thermally insulating material.

7. The apparatus according to claim 5 wherein the rotary arm or the actuating link are made of a material having low thermal conduction.

8. The apparatus according to claim 5 wherein the rotational angle of the pin on movement between the use and other positions is >90° and 180°.

9. The apparatus according to claim 8 wherein the pin is rotated by 110° on movement between the use and other positions.

10. The valve defined in claim 5 wherein the inlet and outlet passages are centered on a common passage axis extending secantally through the chamber offset from a diameter of the chamber and lying generally in a common plane perpendicular to the main axis with a secondary-passage axis and with a flow-passage axis.

11. The valve defined in claim 5 further comprising: the rotary arm fixed to and extending radially of the main axis from an outer end of the pin; and the actuating link coupled to the rotary arm for pivoting the pin between the use position and the other position.

12. The valve defined in claim 5 wherein the secondary passage has a blind inner end and the pin is further formed with a discharge passage extending generally axially from the inner end of the secondary passage to an end face of the pin.

13. A valve comprising:
a housing formed with
    a central chamber centered on and extending along a main axis,
    an inlet passage and an outlet passage having mouths in the chamber spaced angularly from and confronting each other, and
    a secondary passage offset from the inlet and outlet passages and centered on an axis offset from a center of one of the mouths by more than 90°;

a valve pin fitted in the chamber formed with a secantally throughgoing flow passage centered on a flow-passage axis generally parallel to but offset from a diameter of the pin, the valve pin being angularly shiftable between
- a use position with the flow passage aligned between the mouths of the inlet and outlet passages for flow of liquid between the inlet and outlet passages through the flow position and
- another position with the flow passage aligned with the secondary passage and not aligned with the inlet and outlet passages and the pin blocking flow into and out of the inlet and outlet passages through the respective mouths; and a filter in the flow passage, the secondary passage being sufficiently large that, in the other position, the filter can be removed from the flow passage through the secondary passage, the flow passage having a large-diameter upstream portion fitting with the mouth of the inlet passage in the use position and a small-diameter downstream portion fitting with the mouth of the outlet passage in the use position, the filter being of substantially the same diameter as the upstream portion and fitting snugly therein, the secondary passage being of a diameter at least as great as the upstream portion, the housing further being formed with an access bore opening into the chamber in secantal alignment with the secondary passage and blocked by the pin in the use position, the flow passage extending between the secondary passage and the access bore in the other position such that a tool inserted through the access bore can knock the filter out of the flow passage into the secondary passage.

\* \* \* \* \*